US006193904B1

(12) United States Patent
Schoch, Jr. et al.

(10) Patent No.: US 6,193,904 B1
(45) Date of Patent: Feb. 27, 2001

(54) METHOD FOR PREPARATION OF FERRITES

(75) Inventors: Karl F. Schoch, Jr., Pittsburgh; Daryl R. Stough, N. Huntingdon; Theodore R. Vasilow, Irwin; James D. B. Smith, Monroeville, all of PA (US)

(73) Assignee: Northrop Grumman Corporation, Los Angeles, CA (US)

( * ) Notice: Under 35 U.S.C. 154(b), the term of this patent shall be extended for 0 days.

(21) Appl. No.: 09/041,220

(22) Filed: Mar. 12, 1998

(51) Int. Cl.$^7$ .............................. C01G 1/02; C04B 35/26
(52) U.S. Cl. .................................. 252/62.62; 252/62.56; 252/62.57; 252/62.61; 252/62.64; 423/594
(58) Field of Search ..................... 423/594; 252/62.56, 252/62.57, 62.61, 62.62, 62.67

(56) References Cited

U.S. PATENT DOCUMENTS 4,803,291 * 2/1989 Rousset et al. .................... 252/62.56
5,232,617 * 8/1993 Sarda et al. .......................... 423/594
5,772,820 * 6/1998 Schoch, Jr. et al. .................. 156/89

FOREIGN PATENT DOCUMENTS 46-21362 * 6/1971 (JP) .

OTHER PUBLICATIONS

"Metal Iron (III) Oxides", by D. G. Wickham, *Inorganic Synthesis*, 9, pp. 152–157 (1967). no month.
"Effect of Preparation Technique and Calcination Temperature on the Densification of Lithium Ferrites", by D. W. Johnson, Jr., P. K. Gallagher, D. J. Nitti and Frank Schrey, *Ceramic Bulletin*, vol. 53, No. 2, pp. 163–167 (1974). no month.

"Preparation of Lithium Ferrites by Coprecipitation", by Adolph L. Micheli, *IEEE Transactions on Magnetics*, vol. Mag–6, No. 3, pp. 606–608, Sep. (1970). no month.
"A Study of Sintering and Magnetic Parameters of Spinel Lithium Ferrite", by P. Peshev and M. Pecheva, *Mat. Res. bull.*, vol. 15, pp. 1199–1205, (1980). no month.
Lithium Ferrite Formation by Precipitation from Fe (III) Solutions, by C. Barriga et al., *Journal of Solid State Chemistry*, 77, pp. 132–140, (1988). no month.
"Magnetic Ceramics: I, General Methods of Magnetic Ferrite Preparation" by George Economos, J. Am. Ceram. Soc., 38, pp. 241–243 (1955). no month.
"Synthese de Quelques Ferrites par Reaction de Double Decomposition Entre Le Ferrite de Lithium (LiFeO$_2$) et un sel Fondu" by B. Durand and J. M. Paris, Mat. Res. Bull. vol. 10, pp. 695–700, (1975). (Only the abstract is translated in English). no month.
"Preparation of (LiFe$_5$O$_8$) by the Sol–Gel Method", by K. Oda et al., Journal of Materials Science Letters 5, pp. 545–548 (1986). no month.

\* cited by examiner

*Primary Examiner*—C. Melissa Koslow

(57) ABSTRACT

Methods of preparing ferrite powders for use in microwave elements such as isolators, circulators, phase shifters and transmission line elements. In one method separate precipitations of metal dicarboxylate salts such as oxalates or malonates are mixed with a ferrous dicarboxylate. This is followed by mixing and calcining of the precipitated dicarboxylates to form the ferrite powder. In another method metal acetates in a solution of concentrated acetic acidare mixed with iron powder to form a solution which is mixed with malonic acid. The resulting mixed metal malonates are processed into a powder which is calcined to obtain the ferrite. To form a lithium ferrite, lithium carbonate is added to prepared powders prior to the calcining step.

6 Claims, 2 Drawing Sheets

15kv  500%  20.0μm  0021

15kv 500% 20.0μm 0021

US 6,193,904 B1

METHOD FOR PREPARATION OF FERRITES

RELATED APPLICATION

This application is related to application Ser. No. 08/685,885, entitled Process for Fabricating a Microwave Power Device filed Jul. 25, 1996, now U.S. Pat. No. 5,772,820 which is a continuation-in-part of application Ser. No. 08/511,927, entitled Planar Phase Shifters Using Low Coercive Force and Fast Switching, Multilayerable Ferrite, filed Aug. 7, 1995, now U.S. Pat. No. 5,744,025. These applications are herein incorporated by reference.

BACKGROUND OF THE INVENTION

1. Field of the Invention

This invention relates generally to the preparation of ferrites, including garnets, and more particularly to the preparation of ferrites and garnets from a mixture of metal salts of dicarboxylic acids, for use in microwave elements such as isolators, circulators, phase shifters and transmission line components.

2. Description of the Prior Art

Polycrystalline ferrite components for microwave applications are usually made by traditional ceramic processes using ceramic powders which are formed by prereaction of constituent oxides or carbonates at high temperature, that is, greater than 1000° C.

As is well known to those skilled in the art, and as used herein the term "ferrite" relates to magnetic oxides containing iron oxide as their main component and includes both the spinel and garnet crystal structures.

One of the most versatile of these ferrites is magnesium ferrite, which possesses the structure of the mineral spinel, $MgAl_2O_4$, where iron (Fe) replaces the aluminum (Al) atom in the crystal lattice. The versatility of basic magnesium ferrite for microwave applications is demonstrated by the range of magnetic properties available by substitution of divalent ions other than Mg in the spinel structure.

It is well known in the industry that devices operating at low microwave frequencies require materials with low saturation magnetization (4 $\pi M_s$), and materials with high operating frequencies require materials with high 4 $\pi M_s$. To meet this industrial demand for radar and microwave ferrites with a wide range of saturation magnetizations, as well as to tailor other properties such as dielectric loss tangent and ferromagnetic linewidth, the substitution of various elements has been implemented.

Those skilled in the art of producing Mg and Ni ferrites for example, substitute Zn for the Mg or Ni, represented by Me, to about x=0.5 in the general formula $Me_{1-x}Zn_xFe_2O_4$. This has the effect of increasing the 4 πMs. Likewise, Mn is known to reduce dielectric losses in microwave ferrites when similarly substituted in fractions of 0.005<x<0.3, but more commonly in the 0.05<x<0.15 range. It may be added in combination with zinc or other Me. Note that the above equation is merely exemplary. In practice the $MeFe_2O_4$ may have excess Me, (where Me is a 2+ metal ion), that is, the Me:Fe ratio is greater than 1:2.

Lithium ferrites with Me substitutions have the general formula $Li_{1+x/2} Me_x Fe_{2.5-x/2}O_4$. Those skilled in the art of producing Li ferrites for example, substitute Zn, Ni, and Me either singly or in combination to tailor the desired magnetic and dielectric properties. There may be some deviation from this general formula for this ferrite as well.

The transition elements Mn, Fe, Co, Ni, Cu and Zn, and also Li, Ba, and Cd are examples of elements which, when substituted singly or in combination in ferrite compositions, form various ferrites, for example $MnFe_2O_4$, $NiFe_2O_4$, and $Li_{0.5}Fe_{2.5}O_4$. When they are combined, these materials are referred to as mixed ferrites, mixed crystals or solid solution ferrites. Aluminum and titanium are used to reduce the magnetization. In lithium ferrite, the addition of Co can change the sign of the anisotropy constant of the material and also provides a range of spin wave line widths. The inclusion of nickel improves magnetic hysteresis loop squareness.

The cation distribution in the spinel lattice in practical combinations of mixed ferrites defines the properties, and can be affected by firing conditions (temperature, atmosphere, and cooling rate) and chemical purity. Lithium ferrites are susceptible to lithium loss at elevated temperatures (>1000° C.) and magnesium and lithium ferrites exhibit oxygen non-stoichiometry at high temperatures. Magnesium and lithium ferrites can be fired in air or oxygen. Manganese ferrites usually require control of oxygen partial pressure during firing. The sintering temperature for magnesium ferrite is normally high, greater than 1250° C. especially when the starting powder is made by conventional means. The sintering temperature of lithium ferrite is typically <1100° C. Sintering aids such as bismuth oxide or vanadium oxide may be useful for lithium ferrite, but not magnesium ferrite. Copper oxide or glass forming additives such as silicates or borates may assist densification of Mg ferrite, but the microwave dielectric properties are degraded.

Related magnetic ceramic ferrites with the garnet structure are also useful in a variety of applications due to the wide range of elemental substitutions which enables versatility in magnetic and microwave properties. Magnetic garnets with the general formula $Y_3Fe_5O_{12}$ often include multiple substitutions, such as gadolinium, holmium, aluminum and others. The general formula for a garnet with multiple substitutions is $Y_{3-x} Gd_x Fe_{5-y} Al_y O_{12}$. The present invention is useful for these compositions as well.

Doping with small amounts of relaxing ions can drastically change the anisotropies and ferromagnetic resonance. All cations with ionic radii between 0.26 and 1.29 angstroms can be incorporated to tailor the garnet's properties. Examples of useful garnet devices are phase shifters and limiters.

Conventional ceramic powders are made by mixing the oxides or carbonates, calcining, and then milling the reactant. This may be repeated a number of times to achieve chemical homogeneity. For magnesium ferrite, for example, iron oxide and magnesium carbonate powders in the proper ratios are ball milled to mix and pulverize the powders and are then calcined within the range of 800° C. to 1450° C. Note that lithium ferrites are usually calcined at <1000° C., since lithium loss will occur otherwise. The reaction product is again milled and is then spray-dried with a dry pressing binder. The spray dried powder is pressed into a bar or similar shape and fired at 1200–1400° C. whereupon it becomes hard and dense. Final characterization, cutting and machining follow.

The machined ceramic component is then metallized with gold by sputtering, screen printing, or similar methods, which produces the desired microwave circuitry.

Ferrites made by conventional methods are subject to variability in each of the many processing steps, and without very careful process control, their dielectric and magnetic properties vary, and their dielectric losses and ferromagnetic resonance linewidths are higher than desired. The effect of this variability is that the microwave system in which the material is employed does not perform optimally. This is especially true in systems using large antenna arrays, where matching antenna and transmission line elements to close tolerances is required.

For some microwave system components, small and uniform grain size is critical for optimum functioning of the ceramic, however, heat treatment of the powders causes grain growth. The fine and uniform sub-micron-sized particles desired can never be achieved with these powders, even with extensive milling. Therefore, conventional processing yields grains that are already large, limiting the ultimate performance of the ceramic device and system.

Moreover, the magnesium ferrite powders of the prior art are fired at high temperatures in excess of 1200° C. to achieve high density, and this prevents co-firing with metals such as gold, as well as co-firing with most other ceramics used in microwave packaging because of chemical interaction at these high temperatures.

Co-precipitation of ferrites has been known since the mid-1950s via the oxidation of mixed metal hydroxides (G. Economos, J. Am. Ceram Soc., 38,241, 1955). Furthermore, coprecipitation of a mixture of oxalates is a well-known step in preparation of ferrites. Wickam (Inorg. Synth., 9,152 (1967)) and Paris (Thesis, University of Lyon, 1963) describe examples of preparing magnesium ferrites from oxalates. In this process, metal acetates are dissolved in a solution of aqueous acetic acid, which is deaerated by bubbling nitrogen. Iron powder is then added. When vigorous evolution of hydrogen has stopped, the mixture is heated to reflux in order to dissolve the iron completely. The final step of the precipitation is addition of an aqueous oxalic acid solution at elevated temperatures causing formation and precipitation of the mixed oxalates. Rigorous exclusion of oxygen is important in this step because Fe(II) is readily converted to Fe(III) by oxygen under these conditions. The Fe(III) oxalate is soluble in this solution. Thus if any is present, the stoichiometry of the mixed oxalate precipitate would be low in iron content. It is commonly believed that because the oxalate ion is bidentate, the product is a coordination polymer containing all the metal ions present in solution. This method works well for compositions in which all of the metal acetates are soluble in acetic acid and all of the metal oxalates are insoluble under these conditions.

There are, however, several shortcomings of this approach. Primarily, the process must be carried out in the absence of air to prevent Fe(III) formation. Moreover, the dissolution of iron must be carried out slowly because of the vigorous evolution of hydrogen. The coprecipitation of a mixture of oxalates will not work for compositions in which the acetates (or other simple salts) are not soluble, such as those containing aluminum, or for compositions in which the oxalates are soluble, such as compositions containing Li or Ti. In addition, some elements such as titanium or aluminum may be desired in the composition, but may be difficult to precipitate due to formation of complexes or highly pH sensitive solubility. Coprecipitation of a mixture of oxalates will not work for compositions including a metal having a reduction potential greater than Fe$^{2+}$ (−0.447 V vs. H$_2$/H$^+$). Where the reduction potential is greater, such as for Ni or Cu, unwanted metal flakes are formed by reduction of the metal salts in the acetate solution. Finally, there is incomplete control over the metal content of the product because of slightly residual solubility of metal oxalates.

Because of the solubility of lithium hydroxide and oxalate, the hydroxide and oxalate coprecipitation methods are not practicable for lithium ferrites. However, lithium ferrite is also a very versatile ferrite; its magnetic properties can be altered to cover a wide range of values. It differs from magnesium ferrite because it can easily be fired to high density at less than 1000° C. Compositions containing metals such as zinc substituted for part of the iron oxide, and bismuth oxide as a sintering aid are shown to densify at low temperature by D. W. Johnson et. al., ("Effect of Preparation Technique and Calcination Temperature on the Densification of Lithium Ferrites", Bull. Am. Cer. Soc., v.53,2, 1974.) These authors evaluated powders made by conventional (oxide) or non-conventional means, such as precipitation, spray pyrolysis, and freeze drying.

A. Micheli coprecipitated lithium stearate and metal hydroxides("Preparation of Lithium Ferrites by Co-precipitation," IEEE Trans. on Magnetics, p.606–608, September 1970). Pechev and Pecheva spray dried lithium-iron formate solutions and calcined the product to form uniform ferrite powder ("A Study of Sintering and Magnetic Parameters of Spinel Lithium Ferrite", Mat. Res. Bull., Vol. 15, pp 1199–1205, 1980). Oda, et. al. ("Preparation of LiFe$_5$O$_8$ by the Sol-Gel Method", J. Mat. Sci. Let., 5, 1986 545–548) derived ferrite from alkoxides of lithium and iron. C. Barriga, et. al., describe a variant of the precipitation method ("Lithium Ferrite Formation by Precipitation form Fe(III) Solutions, J. Sol. State Chem, 77, 132–140, (1988)).

Powders made by these methods can be used to fabricate microwave elements such as isolators, phase shifters, circulators and limiters. These circuit elements can be used in very low power receiver circuits to multi-kilowatt phased array high power applications. Examples of various shapes include thin films and laminated tapes or toroids and rod-shaped billets.

The manufacture and use of such microwave elements is discussed in greater detail in copending application Ser. No. 08/685,885, entitled Process of Fabricating a Microwave Power Device, filed Jul. 25, 1996.

Because of the importance and variety of uses for microwave elements, there exists a need for highly reliable and low cost methods of ceramic powder production that result in very pure and uniform material. Therefore, the present invention describes novel methods of powder production that provide nearly the chemical homogeneity achievable with coprecipitation, while maintaining the purity, surface area and particle size needed for uniform sintering and densification. Finer grain sizes which effect the properties of the resulting ceramic can also be achieved with these methods.

SUMMARY OF THE INVENTION

Methods of preparing ferrites (including garnets) for manufacture and use in microwave elements are provided.

Traditional methods of ferrite preparation from mixing of oxides or carbonates were time intensive, had to be performed at high temperatures, and often did not result in high yield or purity of ferrite material.

One method disclosed herein relates to ferrite production and utilizes at least one metal oxalate or malonate mixed with an oxalate or malonate of Fe. More metal oxalates or malonates containing for example Mg, Mn, Ni, or Zn, separately prepared, may be additionally used to tailor the mixture for a particular microwave application.

In another aspect of the invention, Li-ferrite is made by mixing lithium carbonate with at least one or two or three or four metal oxalates or malonates containing Mg, Mn, Ni, or Zn, mixed with an oxalate or malonate of Fe. These mixtures are subsequently calcined before processing further into ferrite shapes or bodies.

The garnet preparation method of this invention utilizes at least one or two or three metal oxalates or malonates containing rare earth elements such as Y, Gd, Ho, and other elements such as In and/or Ca, mixed with an oxalate or malonate of Fe. The Fe malonate may be in combination with oxalate or malonate of Al. These mixtures are subsequently calcined before processing further into ferrite shapes or bodies. The preparation of materials such as yttrium-iron-garnet can be performed utilizing similar methods of mixing separately precipitated oxalates or malonates.

In addition, a coprecipitation method is disclosed wherein malonate salts are used in place of normally used oxalate salts to form a ferrite with optimized properties for use as a microwave device.

Other objects and advantages of the invention will become apparent from a description of certain present preferred embodiments thereof and the accompanying drawings.

DETAILED DESCRIPTION OF THE PREFERRED EMBODIMENTS

Dicarboxylic acids are a class of organic materials in which there are two carboxylic acid substituent groups, including oxalic acid, malonic acid, maleic acid, phthalic acid and others. Metal salts derived from these acids are known as dicarboxylates.

The benefits of the mixing of precipitated metal dicarboxylates over coprecipitation methods include:

(1) Dicarboxylates prepared in this way can be blended with others to incorporate metals not amenable to dicarboxylate co-precipitation, such as cobalt, copper or nickel. The dicarboxylates can also be blended with lithium carbonate or lithium bicarbonate.

(2) Only the ferrous dicarboxylate precipitation must be carried out in the absence of oxygen.

(3) The final composition of the powder is assured because mixing the dicarboxylates does not involve dissolution.

(4) Ferrous dicarboxylate can be precipitated from a salt other than Fe(II) acetate, such as a sulfate, which is more readily available.

(5) This method also makes it possible to stockpile metal oxalates and blend them as required thereby allowing flexibility and rapid response to demands for changes in composition.

Figure 1:
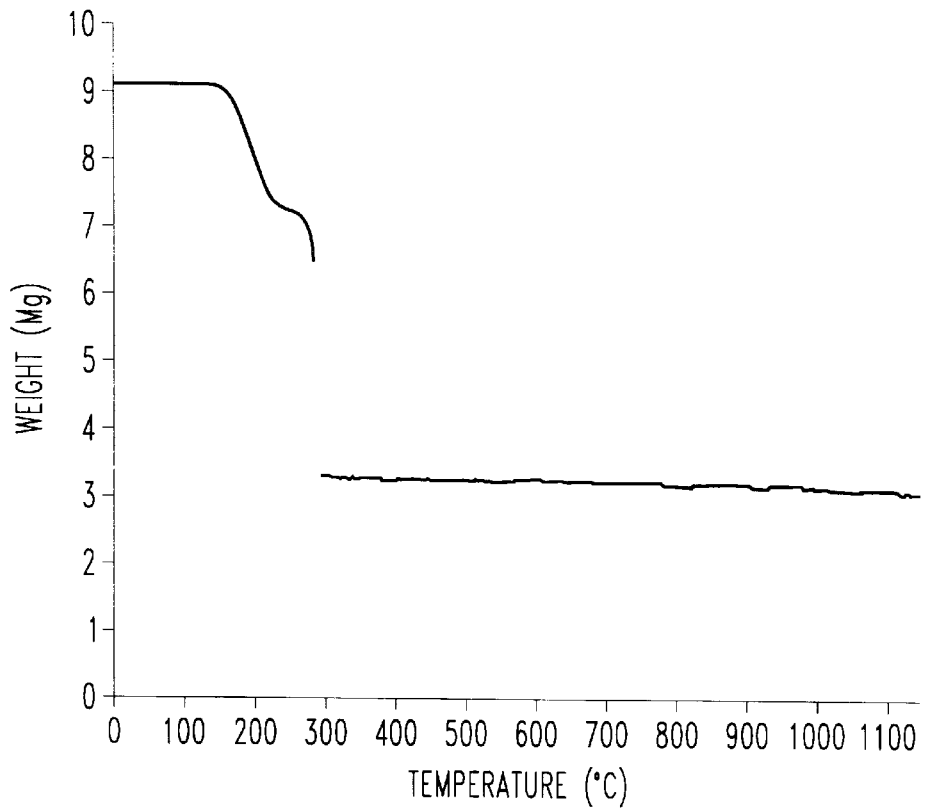
FIG. 1, is a thermogravimetric analysis curve for Mg—Mn—Fe Malonate.
Figure 2:
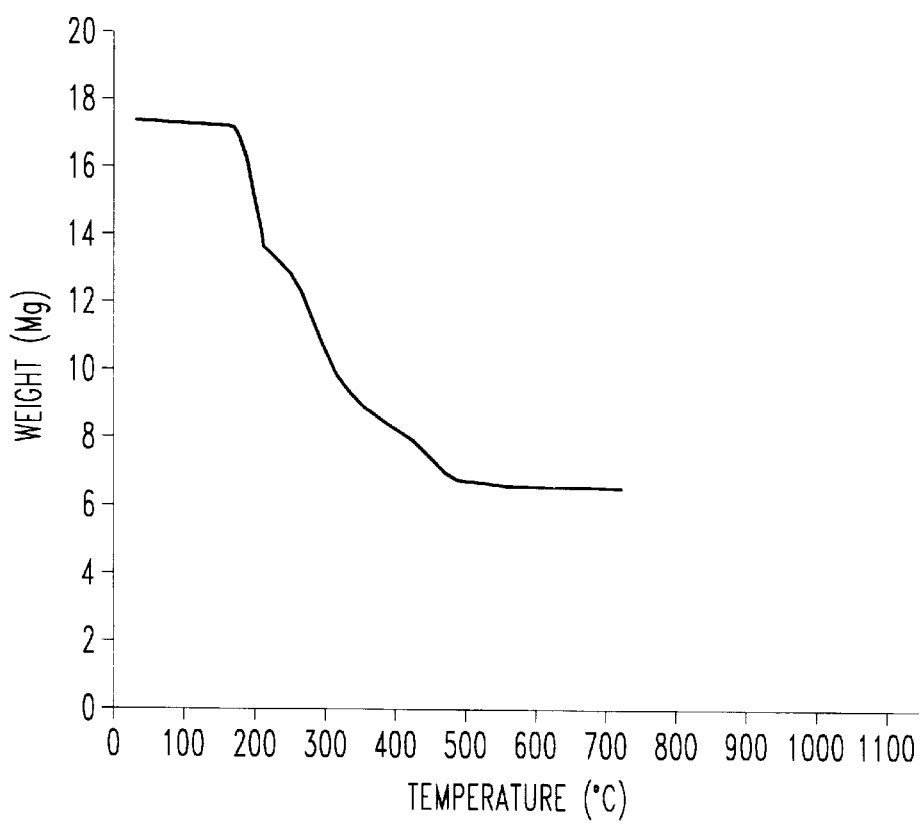
FIG. 2 is a thermogravimetric analysis curve for Mg—Mn—Fe Oxalate.

In another aspect of the invention use of metal malonate salts in place of metal oxalates offers the additional advantage of converting to ferrite at much lower temperature than do the oxalates, as shown in the thermogravimetric analysis curves of FIGS. 1 and 2.

FIG. 1 shows that conversion of the mixed malonate salts to ferrite (as indicated by weight loss at elevated temperature) begins at around 150° C. and is complete at much lower temperature, approximately 290° C., than with mixed oxalate salts having the same proportions of metals.

FIG. 2 illustrates the conversion of the mixed oxalate salts as beginning at approximately 170° C. and reaching completion at around 480° C.

As illustrated in FIG. 1, conversion of the malonates to ferrite is shown to occur in two steps. There is an initial weight loss of 20.8% between 150° C. and 250° C. and another loss of 42.9% between 250° C. and 290° C.

The lower decomposition temperature of the malonates permits a broader range of preparation and calcining conditions compared to the oxalates while retaining the benefits described above. A low decomposition temperature is desirable because conversion to ferrite is likely to occur without substantial sintering. Moreover, there may be some circumstances in which it is desirable to convert certain metal salts to carbonates or oxycarbonates before others, thus suggesting use of a mixture of metal malonates and metal oxalates.

This latitude permits selection of conditions to optimize surface area, sintering, densification and grain size which affect the properties of the resulting component. Finally, malonates may be considered to be less toxic than oxalates. This general approach should be effective with any metal salts of dicarboxylic acids such as succinic, glutaric acids, etc. that are insoluble in aqueous solution.

The preparation of ferrites and related materials may be fabricated according to the following steps.

Preparation of Ferrites by Mixing of Precipitated Oxalates

1. Mn-doped Magnesium Ferrite

A. Magnesium Oxalate: A solution of 144.5 g of $Mg(OAc)_2.4H_2O$ dissolved in 400 ml water was prepared. A second solution of 600 ml water and 86.68 g oxalic acid dihydrate, $C_2O_4H_2.2H_2O$, was prepared and warmed to 38° C. in order to dissolve the oxalic acid completely. This solution was added to the magnesium acetate solution forming a white precipitate immediately. The product was collected by filtration, washed with water, and dried in air overnight. The yield was 98.52 grams of magnesium oxalate, $Mg(C_2O_4).2 H_2O$.

B. Manganese Oxalate: A solution of 136.98 g of $Mn(OAc)_2.4H_2O$ dissolved in 346 ml water was prepared. A second solution of 303 ml water and 71.84 oxalic acid dihydrate, $C_2O_4H_2.2H_2O$ was prepared and added to the acetic acid solution. A white precipitate formed immediately and was collected by filtration, washed with water, and dried in air overnight. The yield was 103.76 grams of manganese oxalate, $Mn(C_2O_4).2H_2O$.

C. Ferrous Oxalate: A solution containing 71.48 g oxalic acid dihydrate, $C_2O_4H_2.2H_2O$, dissolved in 1000 ml water was deaerated for 30 minutes using flowing nitrogen. 154.54 g $FeSO_4.7H_2O$ was added, causing immediate formation of a yellow precipitate. The product was collected by filtration, washed with water, and dried in air overnight. The yield was 91.62 grams of ferrous oxalate, $Fe(C_2O_4).2H_2O$.

D. Ferrite Preparation: In order to prepare a ferrite having the composition $Mg_{1.279}Mn_{0.057}Fe_{1.776}O_4$, the following oxalates were suspended in water: 34.46 g $Mg(C_2O_4).2H_2O$, 2.07 g $Mn(C_2O_4).2H_2O$ and 64.73 g $Fe(C_2O_4).2H_2O$. The suspension was immediately filtered and the solid was dried. The mixture was calcined at 600° C. to form a ferrite which was further processed by tape casting and sintering, as described in copending application Ser. No. 08/685,885, entitled Process For Fabricating a Microwave Power Device, filed Jul. 25, 1996.

E. Properties: A comparison of composition and saturation magnetization between ferrites derived from coprecipitated oxalates and mixing separate oxalates is given in Table 1 and illustrates very similar values for the two methods. The differences between the two batches were within experimental uncertainty.

TABLE 1

Comparison between ferrites prepared from coprecipitation oxalates and from a mixture of separate oxalates

| Method | Composition (wt %) | | | |
|---|---|---|---|---|
| | MgO | $MnO_2$ | $Fe_2O_3$ | $4\pi M_s$ |
| Coprecipitated | 24.60 | 2.44 | 72.96 | 2149 |
| Mixture | 25.43 | 2.14 | 72.43 | 2017 |

2. Lithium-Zinc Ferrite

A ferrite composition containing lithium is difficult to prepare from coprecipitated oxalate because of the appreciable solubility of lithium oxalate in aqueous solution. The method described in this invention makes the preparation of lithium ferrites a simple matter.

A. Zinc-Manganese-Ferrous Oxalate: A mixed oxalate containing Zn(II), Mn(II) and Fe(II) was prepared by the standard method. $Mn(OAc)_2.4H_2O$ (175.3 g) and $Zn(OAc)_2.2H_2O$ (1255.9 g) were dissolved in a solution of 5525 ml concentrated HOAc and 8500 ml water in a 50 liter cylindrical reactor. The solution was deaerated with flowing nitrogen at room temperature for 17.5 hours. Next, iron powder (1797.4 g) was added to this solution. After three hours at room temperature, the solution was heated to reflux over five hours. After refluxing for 16 hours, the solution was cooled at 50° C. and a deaerated solution of oxalic acid (4966.5 g) in water (14,000 ml) was pumped into the reactor containing the solution of acetates. There was immediate precipitation of the mixed oxalate and the temperature increased to 80° C. When the addition was complete, the reactor was cooled to 35° C. over approximately 30 minutes. The reactor was drained and product collected by filtration, washing and drying. The yield was 7071 g of mixed oxalate.

B. Ferrite Preparation: A ferrite having the composition $Li_{0.37}Mn_{0.05}Zn_{0.39}Fe_{2.25}O_4$ was prepared by dry blending $Li_2CO_3$ (3.77 g) and the Zn—Mn—Fe mixed oxalate (110.93 g) prepared above. This mixture was ball milled in water for 15 to 17 hours. The mixture was removed from the mill by washing with water and allowing the water to evaporate. The crushed product was then calcined at 350° C. to form a ferrite and was further processed by tape casting and sintering at 950° C., as described in co-pending U.S. application Ser. No. 08/685,885, entitled Process For Fabricating a Microwave Device, filed Jul. 25, 1996.

Figure 3:
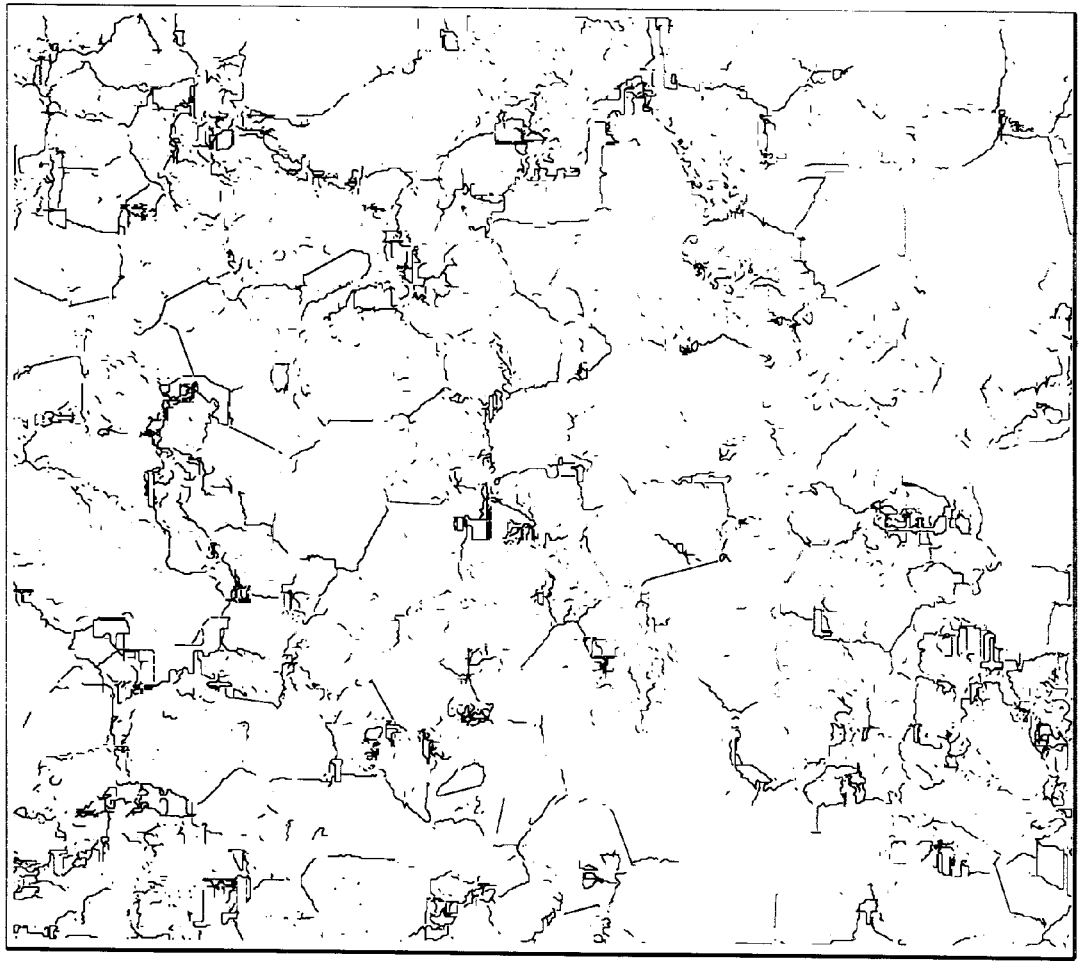
FIG. 3 is a scanning electron micrograph of $Li_{0.70}Ti_{0.41}Mn_{0.10}Fe_{1.8}O_4$ after sintering (shown at 500× magnification).

C. Properties: As illustrated in FIG. 3, the sintered parts showed excellent densification. The saturation magnetization was measured at 4524 Oe.

Preparation of Yttrium Iron Garnet By Mixing of Precipitated Oxalates

3. Yttrium Iron Garnet

A. Yttrium Oxalate: 53.21 g of yttrium acetate $(Y(OAc)_3.4H_2O)$ was dissolved in 500 ml deionized water raising the temperature to 39° C. Separately, 38.58 g oxalic acid dihydrate $(C_2O_4H_2.2H_2O)$ was dissolved in 300 ml deionized water. The solutions were mixed, bringing about immediate precipitation of $Y_2(C_2O_4)_3.4H_2O$. After filtering, washing and drying in air overnight, the yield was 41.9 g.

B. Ferrous Oxalate: A solution containing 71.48 g oxalic acid dihydrate, $C_2O_4H_2.2H_2O$, dissolved in 1000 ml water was deaerated for 30 minutes using flowing nitrogen. 154.54 g $FeSO_4.7H_2O$ was added, causing immediate formation of a yellow precipitate. The product was collected by filtration, washed with water, and dried in air overnight. The yield was 91.62 grams of ferrous oxalate, $Fe(C_2O_4).2H_2O$.

C. Yttrium Iron Garnet: Yttrium iron garnet $(Y_3Fe_5O_{12})$ was prepared by dry blending 64.59 g $Y_2(C_2O_4)_3.4.4H_2O$, and 148.78 g $Fe(C_2O_4).2H_2O$. This powder was calcined and processed into a tape as described in copending U.S. application Ser. No. 08/685,885. Alternatively, the powder can be processed into toroids or billets for use in high powered microwave applications.

Preparation of Ferrites by Coprecipitation of Malonates

4. Mn-doped Magnesium Ferrite

A. Coprecipitation of Malonate Salts: Deionized water (226 ml) and glacial acetic acid (528 ml) are mixed in a 2-L flask. 157.72 g of magnesium acetate tetrahydrate (Mg $(OAc)_2.4H_2O)$ and 7.08 g of manganese acetate tetrahydrate $(Mn(OAc)_2.4H_2O)$ were added to this solution. After deaerating for 21 hours with nitrogen, iron powder (47.78 g) was added under nitrogen and allowed to react at room temperature for 4 hours. This solution was then brought to reflux overnight. Separately, a solution of malonic acid $(C_3O_2H_5$, 170.22 g) in 120 ml deionized water was prepared and deaerated with nitrogen. The solutions were mixed and allowed to cool to room temperature over approximately two hours. Filtering and washing the precipitate yielded 206.5 g of the coprecipitated malonates.

B. Ferrite Preparation: The coprecipitated malonates were calcined at 500° C. and formulated into a slurry for tape casting as described in copending U.S. application Ser. No. 08/685,885. That application also describes the conversion of the cast tape into ferrite parts.

Preparation of Ferrites by Mixing of Precipitated Malonates

5. Mn-doped Magnesium Ferrite

A. Magnesium Malonate: 180.6 g of magnesium acetate tetrahydrate $(Mg(OAc)_2.4H_2O)$ was dissolved in 500 ml deionized water. Separately, 89.4 g malonic acid $(C_3O_4H_4)$ was dissolved in 60 ml deionized water. The solutions were mixed, bringing about immediate precipitation of $Mg(C_3O_4H_2)_3.nH_2O$. After filtering and washing, the yield was 136 g.

B. Manganese Malonate: 45.2 g of manganese acetate tetrahydrate $(Mn(OAc)_2.4H_2O)$ was dissolved in 100 ml deionized water. Separately, 19.6 g malonic acid $(C_3O_4H_4)$ was dissolved in 15 ml deionized water. The solutions were mixed, bringing about immediate precipitation of $Mn(C_3O_4H_2)_3.nH_2O$. After filtering and washing, the yield was 36 g.

C. Ferrous Malonate: A solution containing 118 g malonic acid $(C_3O_4H_4)$ dissolved in 1300 ml deionized water was deaerated with nitrogen for 30 minutes. Ferrous sulfate heptahydrate $(FeSO_4.7H_2O$, 309 g) was added, causing immediate precipitation of the malonate salt, $Fe(C_3O_4H_2)_3.nH_2O$. After filtering and washing, the yield was 200 g.

D. Ferrite Preparation: A ferrite having the composition $Mg_{1.30}Mn_{0.14}Fe_{1.7106}O_4$ was prepared by dry blending malonates in the following proportions 105.88 g $Mg(C_3O_4H_2)_3.nH_2O$, 13.46 g $Mn(C_3O_4H_2)_3.nH_2O$, and 154.87 g $Fe(C_3O_4H_2)_3.nH_2O$. This powder was calcined and processed into a tape as described in copending U.S. application Ser. No. 08/685,885.

While certain present preferred embodiments have been shown and described, it is distinctly understood that the invention is not limited thereto but may be otherwise embodied within the scope of the following claims.

What is claimed is:

1. A method of preparing a ferrite microwave element, comprising the steps of:
   (A) mixing at least two separately prepared metal dicarboxylates, at least one of which is ferrous dicarboxylate;
   (B) calcining the mixed metal dicarboxylates to form said ferrite; and
   (C) additionally processing said ferrite to form a microwave element.

2. A method of preparing a ferrite microwave element, comprising the steps of:
   (A) mixing at least two separately prepared metal dicarboxylates, at least one of which is a rare earth metal dicarboxylate and another of which is a ferrous dicarboxylate;
   (B) calcining the mixed metal dicarboxylates to form said ferrite; and
   (C) additionally processing said ferrite to form a microwave element.

3. A method of preparing a ferrite powder comprising the steps of:
   (A) dissolving at least first and second metal acetates in a solution of concentrated acetic acid to form a first solution;
   (B) deaerating said first solution;
   (C) adding iron powder to the deaerated solution;
   (D) refluxing the solution;
   (E) cooling the solution;
   (F) deaerating a solution of oxalic acid in water;
   (G) mixing the solution of oxalic acid with the first solution to form a precipitate of mixed oxalates;
   (H) filtering, washing and drying the mixed oxalates precipitate to form a mixed oxalate powder;
   (I) adding lithium carbonate to said mixed oxalate powder; and
   (J) calcining said lithium carbonate and said mixed oxalate powder to form said ferrite.

4. A method of preparing a ferrite compound, comprising the step of:
   (A) mixing at least two separately prepared metal dicarboxylates, at least one of which is ferrous dicarbonate;
   (B) adding lithium carbonate to the mixture of step (A); and
   (C) calcining the mixed metal dicarboxylates and lithium carbonate powder to form Said ferrite.

5. A method of preparing a ferrite powder comprising the steps of:
   (A) dissolving a first metal acetate in water and mixing the resulting solution with a solution of an aqueous dicarboxylic acid to form a first metal dicarboxylate precipitate;
   (B) filtering, washing and drying said first metal dicarboxylate precipitate to form a first metal dicarboxylate powder;
   (C) separately dissolving at least a second metal acetate in water and mixing the resulting solution with a solution of an aqueous dicarboxylic acid to form at least a second metal dicarboxylate precipitate;
   (D) filtering, washing and drying said at least second metal dicarboxylate precipitate to form at least a second metal dicarboxylate powder;
   (E) mixing a ferrous dicarboxylate powder with said first and said at least second metal dicarboxylate powders;
   (F) adding lithium carbonate powder to the mixture of step (E); and
   (G) calcining the mixed powders and lithium carbonate powder to form said ferrite.

6. A method of preparing a ferrite powder comprising the steps of:
   (A) dissolving at least first and second metal acetates in a solution of concentrated acetic acid to form a first solution;
   (B) deaerating said first solution;
   (C) adding iron powder to the deaerated solution;
   (D) refluxing the solution;
   (E) deaerating a solution of malonic acid in water;
   (F) mixing the solution of malonic acid with the first solution to form a precipitate of mixed malonates;
   (G) cooling the results of step (F);
   (H) filtering, washing and drying the mixed malonate precipitate to form a mixed malonate powder;
   (I) adding lithium carbonate powder to the mixed malonate powder; and
   (J) calcining the mixed malonate powder and lithium carbonate powder to form said ferrite.

* * * * *